(12) United States Patent
Halabi (10) Patent No.: US 9,363,140 B2
(45) Date of Patent: Jun. 7, 2016

(54) SYSTEM AND METHOD FOR ANALYZING AND REPORTING GATEWAY CONFIGURATIONS AND RULES

(71) Applicant: Bank of America Corporation, Charlotte, NC (US)

(72) Inventor: Mohamad Halabi, Denver, CO (US)

(73) Assignee: Bank of America Corporation, Charlotte, NC (US)

( * ) Notice: Subject to any disclaimer, the term of this patent is extended or adjusted under 35 U.S.C. 154(b) by 231 days.

(21) Appl. No.: 13/965,337

(22) Filed: Aug. 13, 2013

(65) Prior Publication Data

US 2015/0052147 A1 Feb. 19, 2015

(51) Int. Cl.
G06F 17/30 (2006.01)
H04L 12/24 (2006.01)
H04L 12/64 (2006.01)

(52) U.S. Cl.
CPC ...... H04L 41/0853 (2013.01); G06F 17/30424 (2013.01); H04L 12/6418 (2013.01)

(58) Field of Classification Search
CPC .................... G06F 17/30424; G06F 17/30312
USPC ........................................................ 707/741
See application file for complete search history.

(56) References Cited

U.S. PATENT DOCUMENTS

| 2002/0069274 A1* | 6/2002 | Tindal et al. .................. 709/223 |
| 2010/0217944 A1* | 8/2010 | DeHaan ................ G06F 1/3203 711/156 |
| 2013/0238629 A1* | 9/2013 | Kosuri et al. .................. 707/741 |

OTHER PUBLICATIONS

Daniel Petri; Convert an IP Address from Decimal to Binary Form; Posted on Jan. 7, 2009; https://www.petri.com/csc_convert_ip_address_from_decimal_to_binary.*

* cited by examiner

*Primary Examiner* — Alexey Shmatov
(74) *Attorney, Agent, or Firm* — Michael A. Springs (57) ABSTRACT

A method for analyzing and reporting gateway configurations and rules includes receiving configuration data from gateway devices providing access to an enterprise network. The gateway devices may be associated with multiple vendors. At least one computer processor parses the configuration information associated with each of the gateway devices to identify configuration output data for each of the gateway devices. The configuration output data for each of the gateway devices is stored in a single data structure. The configuration output data stored in the single data structure is indexed to generate one or more optimized data tables.

17 Claims, 5 Drawing Sheets

| Policy | Security Rules | NAT Rules |
|---|---|---|
| gateway object identifier$_1$ | 1 | 4 |
| gateway object identifier$_2$ | 1 | 4 |
| gateway object identifier$_3$ | 1 | 4 |
| gateway object identifier$_4$ | 1 | 2 |

FIG. 3A

| Source | Destination | Service | Action | Track | GW | Time | Comments | Match |
|---|---|---|---|---|---|---|---|---|
| Source Add₁ | Destination Add₁ | ssh telnet | Accept | Log | Gateway Object | Any | No Comments | Object id₁ |
| Source Add₂ | Destination Add₂ | icmp-proto | Accept | Log | Gateway Object | Any | No Comments | Object id₂ |
| Source Add₃ | Destination Add₃ | pings ssh | Accept | Log | Any | Any | No Comments | Object id₃ |
| Source Add₄ | Destination Add₄ | pings | Accept | Log | Any | Any | No Comments | Object id₄ |
| 34 | 35 | 104 | 135 | | | | | |

SYSTEM AND METHOD FOR ANALYZING AND REPORTING GATEWAY CONFIGURATIONS AND RULES

TECHNICAL FIELD OF THE INVENTION

The present invention relates generally to the field of gateway configuration and more particularly to a system and method for analyzing and reporting gateway configurations and rules.

BACKGROUND OF THE INVENTION

Security gateways may be used to protect a private enterprise network from outside attacks. Additionally, such gateways may be used to separate an enterprise network from partner networks within a large infrastructure. For example, a firewalls and other security device may be deployed at the perimeter of the protected network. The firewall or other security device may operate to inspect incoming traffic received from outside entities to prevent unauthorized traffic that may be malicious or otherwise harmful to the enterprise.

As the number and complexity of gateways employed by an enterprise increase, the ability to manage the configurations, policies, and rules associated with these gateways becomes increasingly difficult. These difficulties may be acerbated when an enterprise employs security devices provided by multiple vendors. Where the devices span multiple technologies and/or platforms, it may become increasingly difficult to understand the security policies deployed on each device.

SUMMARY OF THE DISCLOSURE

In accordance with the present invention, disadvantages and problems associated with analyzing and reporting gateway configurations and rules may be reduced or eliminated.

According to one embodiment, a method for analyzing and reporting gateway configurations and rules includes receiving configuration data from gateway devices providing access to an enterprise network. The gateway devices may be associated with multiple vendors. At least one computer processor parses the configuration information associated with each of the gateway devices to identify configuration output data for each of the gateway devices. The configuration output data for each of the gateway devices is stored in a single data structure. The configuration output data stored in the single data structure is indexed to generate one or more optimized data tables.

Certain embodiments of the invention may provide one or more technical advantages. A technical advantage of one embodiment may be that the invention provides a mechanism for analyzing and reporting gateway configurations and rules and policies across an enterprise network. In particular embodiments, configuration data may be gathered from multiple gateway devices regardless of the vendors from which the gateway devices were purchased and/or the platform employed by the gateway devices. As an additional advantage, all firewall policies may be viewed from a single page. In certain embodiments, the report may be exported into a spread sheet format for ease of review and analysis. Additionally or alternatively, the firewall search results may be displayed such that matching objects are identified in a manner that demonstrates to the user what caused the match to be displayed.

Still another advantage may be that certain embodiments allow bulk queries to be submitted. Yet another advantage may be that certain embodiments allow users to execute customized searches that limit results by exempting certain object names. As a result, search results may be narrowed to facilitate reporting. Additionally or alternatively, an indexing scheme may be used to ensure fast reporting.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1 through 5 of the drawings, like numerals being used for like and corresponding parts of the various drawings.

This disclosure describes a system for managing network security. As the world becomes increasingly digital and interconnected, the security risks posed to networks becomes more diverse and difficult to manage. To protect against such security threats, an enterprise network may employ a number of security gateways. Each gateway may be separately configured based on vendor requirements and/or the type of threat anticipated by the gateway. Understanding gateway configurations and policies may help to prevent against various security threats.

Accordingly, the proposed system may gather configuration data from the gateway devices deployed across the enterprise network. Such data may be gathered from each gateway device regardless of the specific vendors providing the devices and/or the security policies employed by the devices. The configuration data may be maintained locally by the server so that users may obtain accurate and up to date configuration data. Such data may be used to properly understand network context and reduce network risks. In one example, a user may compare the configuration of one gateway device to the configuration of another gateway device. In still another example, a user may search configuration data to identify the configuration of a particular gateway device. In still another example, a user may search configuration data to identify gateway devices that are configured similarly or that employ similar security policies.

Figure 1:
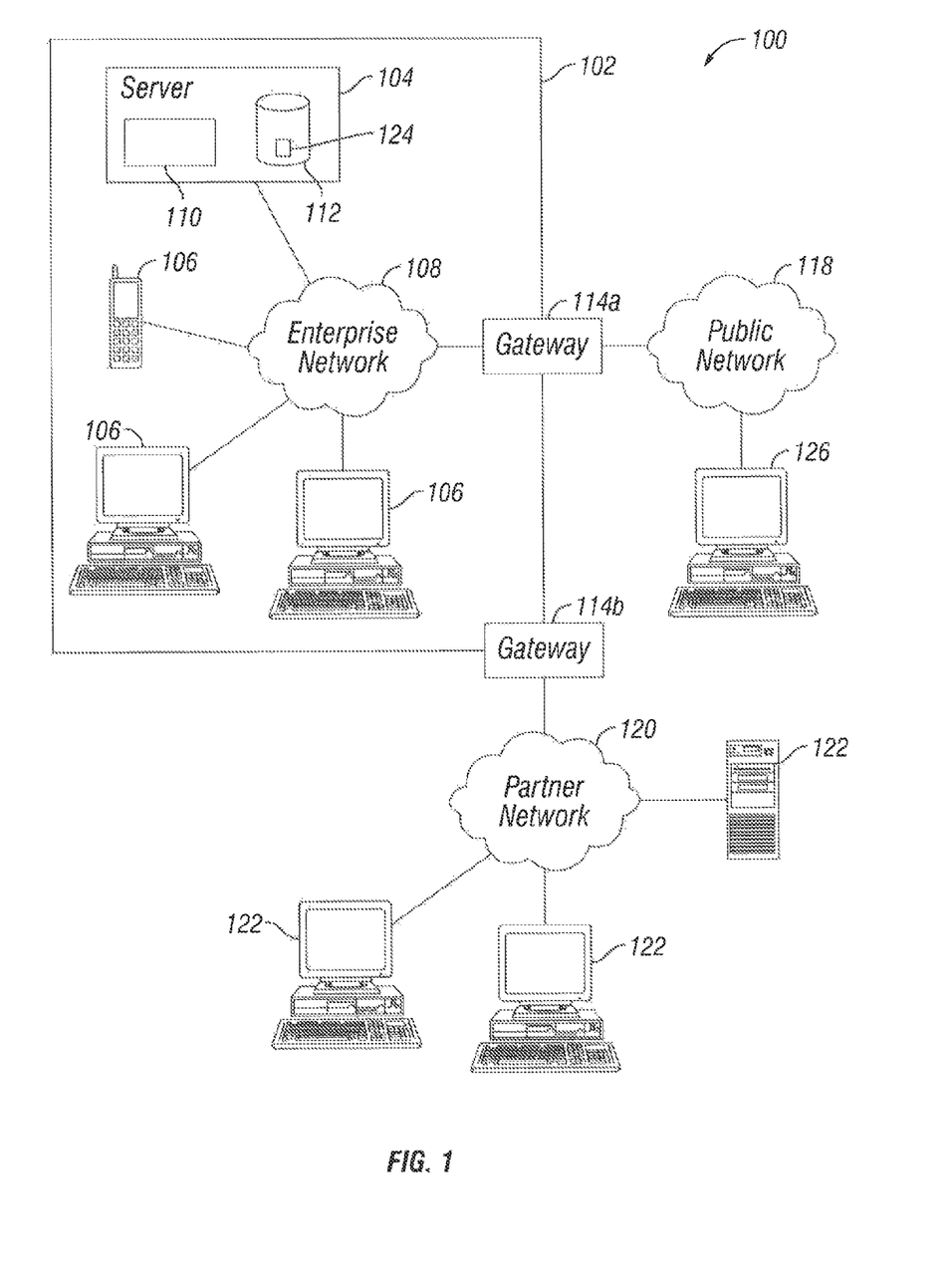
FIG. 1 illustrates an enterprise system that allows for the management of multiple security gateways deployed across an enterprise network.

FIG. 1 illustrates an example system 100 that facilitates the management of security devices and security policies deployed across an enterprise system 102. As depicted, enterprise system 102 includes an enterprise server 104, which communicates with one or more user devices 106 over enterprise network 108. Enterprise server 104 includes a processor 110, which is communicatively coupled to a memory 112. In particular embodiments, enterprise system 100 also includes multiple gateway devices 114, which operate to protect from enterprise network 102 and enterprise devices 104-112 from harmful traffic that originates outside enterprise system 102. For example, gateway devices 114 may include firewalls that are individually configured to filter out harmful traffic received by enterprise system 102. In particular embodiments, for example, a firewall 114a may protect enterprise system 102 from traffic that originates outside enterprise system 102. For example, a firewall 114a may protect enterprise system 102 from traffic that originates from any device such as computer 116 computer communicating with enterprise system 102 via a public network 118, such as the Internet. As another example, a firewall 114b may protect enterprise system 102 from harmful traffic that originates from any device 120 communicating with enterprise system 102 via a partner network 120.

User devices 106 may include workstations such as processors, personal computers, laptops, an electronic notebook, a wireless or cellular telephone, a personal digital assistant, a tablet, or any other device (wireless, wireline, or otherwise) capable of receiving, processing, storing, and/or communicating information with other components of enterprise system 102. User devices 106 may also include a user interface, such as a display, a touch screen, a microphone, keypad, or other appropriate terminal equipment usable by user 112 for the purpose of requesting and receiving gateway configuration data from server 104. Each user device 106 may include a processor and memory to execute an application to perform any of the functions described herein.

Enterprise network 108 facilitates communications between user devices 106 and enterprise server 110. This disclosure contemplates any suitable network 108 operable to facilitate communication between the components of enterprise system 102. In particular embodiments, enterprise network 108 may include any interconnecting system capable of transmitting audio, video, signals, data, message, or any combination of the preceding. Though enterprise network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless networks or other suitable public or private communication link, it may be recognized that in particular embodiments, enterprise network 108 includes a private network such as an Intranet net that is maintained for the private communication of enterprise communications. As discussed above, gateway devices 114 may operate to protect enterprise components from threats generated outside enterprise network 102.

As described above, enterprise server 104 includes a processor 112 and memory 112 for performing various functions to inform users of user devices 106 of configuration data associated with gateway devices 114. For example, processor 110 may control the operation and administration of enterprise server 104 by processing information received from enterprise network 108 and memory 112. Processor 110 may include any hardware and/or software that operates to control and process information. Processor 110 may be a programmable logic device, a microcontroller, a microprocessor, any suitable processing device, or any suitable combination of the preceding. Memory 112 of enterprise server 104 may perform storage functions such as storing configuration data received from gateway devices 114. Memory 112 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices.

Enterprise server 110 may receive configuration data 124 from gateway devices 114. Configuration data 124 may include information associated with the configuration and/or security rules and policies implemented by security gateway devices 114. In particular embodiments, gateway devices 114 may include firewalls that operate to monitor traffic that is received from sources outside of enterprise system 102. For example, gateway device 114a may include a firewall that monitors traffic received from one or more user devices 126 via public network 118. As another example, gateway device 114b may include a firewall that monitors traffic received from one or more user devices 122 via a partner network 120.

In various embodiments, it is generally recognized that each of networks 118 and 120 may include any suitable system capable of transmitting audio, video, signals, data, messages, or any combination of the preceding. However, in a particular embodiment, public network 118 includes all or a portion of a public switched telephone network (PSTN), a public data network, or a local, regional, or global communication or computer network such as the Internet. In contrast, partner network 120 may include a private data network such an Intranet. In a particular embodiment, partner network 120 may be associated with an entity that has a relationship with enterprise network 102. As such, partner network 120 may be afforded a greater level of trust than public network 118. For example, the policies and security rules implemented by gateway 114b may be less strict than the policies and security rules implemented by gateway 114a. Configuration data 124 maintained by enterprise server 104 may reflect the policies and security rules particular to each gateway 114.

In particular embodiments, enterprise server 104 received configuration data 124 on a periodic basis. For example, enterprise server 104 may poll or otherwise request configuration data 124 from firewalls 114 on a daily, weekly, monthly or other predetermined interval. Configuration data 124 may include tables containing separate firewall information such as firewall host objects, ranges, networks, groups, firewall security rules, & firewall NAT rules. In particular embodiments, configuration data 124 may be stored in a data structure that includes a flat file. In other embodiments, a more complex data structure such as a database stored in memory 112 may be used to store configuration output data 124.

As will be described in more detail below, enterprise server 104 may process configuration data 124 received from the various gateway devices 114 so that configuration data 124 from gateway devices 114 offered by a variety of vendors may be stored together in a unified searchable data structure such as memory 112. In particular embodiments, enterprise server 104 may use a proprietary indexing scheme to ensure that configuration data 124 from different sources is more readily searchable. The indexing scheme may ensure faster reporting of configuration data 124 extracted from security devices 114 from a variety of platforms.

Figure 2:
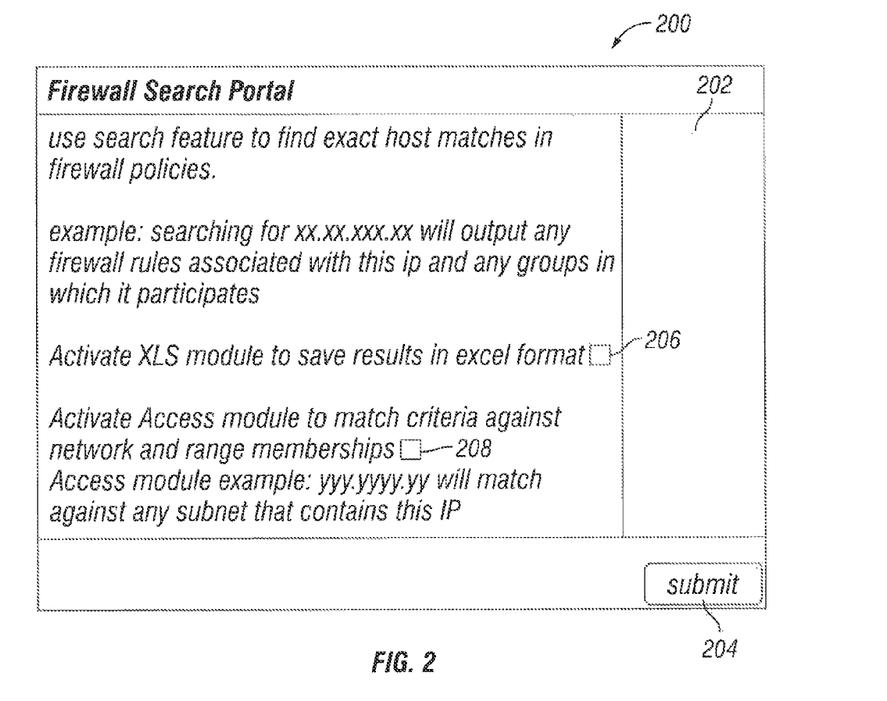
FIG. 2 illustrates an example GUI that operates as a search portal to facilitate the searching and reporting of security rules and policies employed by security gateways deployed across an enterprise network.

Additionally, enterprise server 104 may provide a firewall search portal to enable users of user devices 106 to search for specific gateway devices 114, specific gateway configurations, and/or specific policies or rules implemented by gateway devices 114. The firewall search portal may include a graphical user interface (GUI) that is displayed on user devices 106. FIG. 2 illustrates an example GUI 200 that operates as a search portal to facilitate the searching and reporting of security rules and policies employed by security gateways 114 deployed across enterprise network 104.

As illustrated, GUI 200 includes a search input field 202 and a submit button 204. In a particular embodiment, a user may input an object identifier such as the IP address assigned to a security gateway 114 to identify the firewall rules and policies associated with the security gateway 114. In some embodiments, such a query may also result in the identification of any groups in which the security gateway 114 participates.

Additionally or alternatively, multiple object identifiers may be input in search input field 202. For example, bulk queries may be performed to search for many objects at one time. As another example, two or more object identifiers may be submitted to allow the user to compare the configuration of one security gateway 114 to one or more additional security gateways 114. The data output to the user in response to such a search may include the identification of equivalent rules as well as no match rules.

GUI 200 may also allow a user to execute customized searches that limit search results by exempting certain object names that may be matched to all security gateways 114. For example, the user may exempt a global object such that the search results may be narrowed. Allowing the user to declare exemption criteria for a search job, enables the user to more gain a clearer picture of gateway dependencies.

As illustrated, GUI 200 also includes an option box 206 that allows the user to specify that the results of the query should be provided in a designated format. Specifically, GUI 200 allows the user to activate an XLS module to result in the results being output and/or saved as an Microsoft Excel file. Additionally, GUI 200 include an option box 208 to allow a user to activate access module to match criteria against network and range memberships.

Figure 3A:
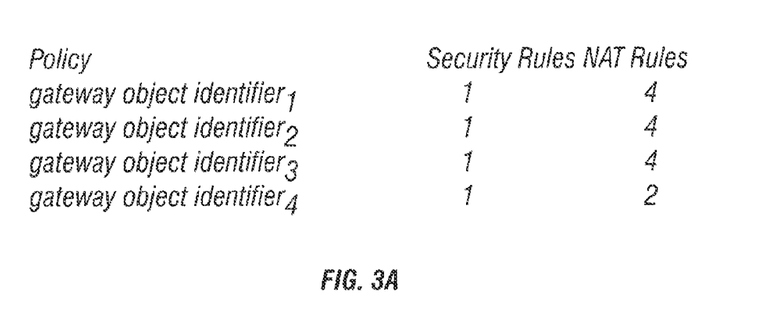
FIGS. 3A-3B illustrate example output reports identifying security rules and policies employed by security gateways deployed across an enterprise network.
Figure 3B:
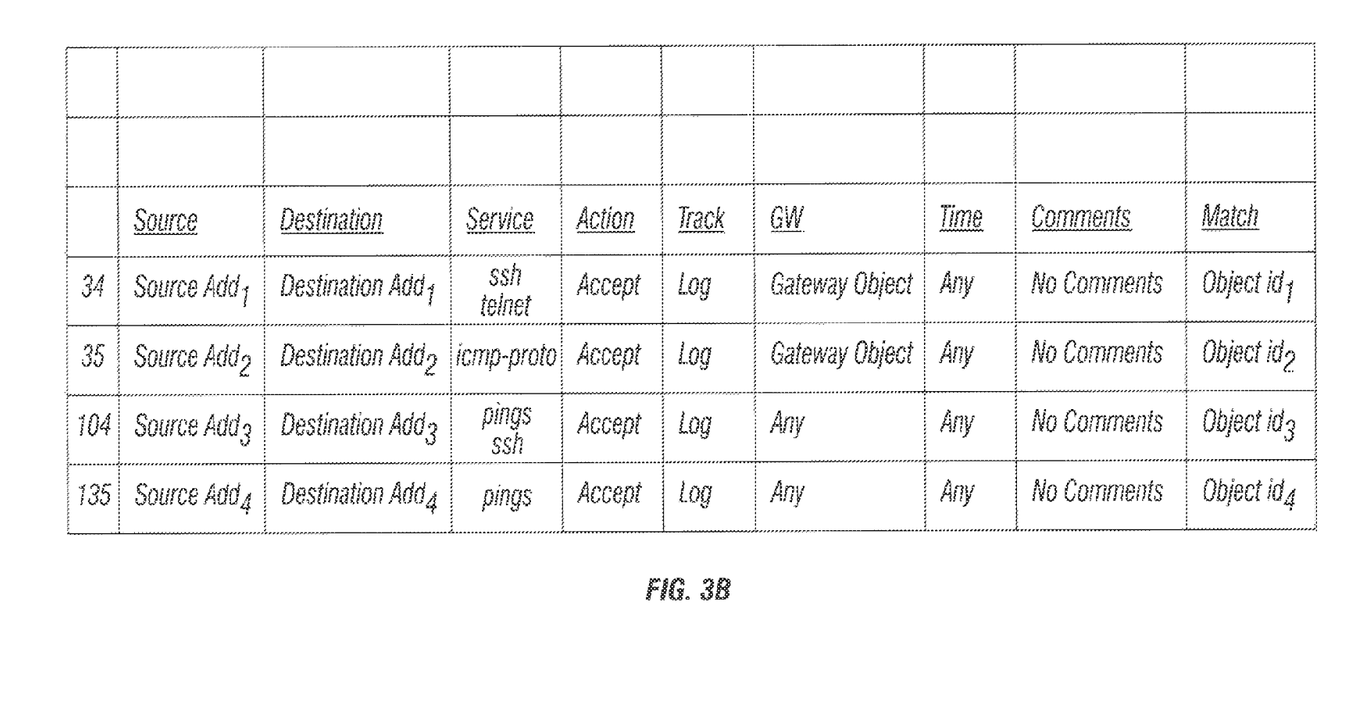

In response to a receiving a search query via GUI 200, enterprise server 104 may execute the search against configuration data 124 stored in memory 112. Enterprise server 104 may then provide a single page that summarizes the query results for the user. FIGS. 3A and 3B illustrate example output reports 300 and 302 identifying security rules and policies deployed across an enterprise network Specifically, FIG. 3A depicts an example report 300 that includes a table identifying the gateway devices 114 matching the search query. Each gateway device 114 is depicted as being identified by an object identifier. Additionally, the particular security rules and/or NAT rules that are deployed by the gateway device 114 may also identified. FIG. 3B depicts an example report that includes a table 302 that summarizes the data associated with each security rule identified in table 300. Specifically, FIG. 3B identifies a destination address, source address, action, track, gateway object identifier, time, and any comments relating to the rule. In particular embodiments, the comments may include statements input by an administrator and may identify why the rule was put into affect. Additionally, FIG. 3B pinpoints the matching objects that caused the rule to be displayed. This feature allows a user to more quickly identify what caused the object to be returned as matching the search query.

Modifications, additions, or omissions may be made to the reports 300 and 302, GUI 200, and system 100 without departing from the scope of the invention. For example, reports 300 and 302 may include less or additional information than depicted. It may be recognized that reports 300 and 302 may include any information relating to the configurations, policies or rules associated with a gateway or other enterprise device. As another example, system 100 may implement perfection procedures different from or in addition to those describe herein. As yet another example, system 100 may include any number of user and/or mobile devices 106, networks, and gateway devices 114. Similarly, enterprise server 104 may include any number of interfaces, processors, and memories. Any suitable logic may perform the functions of system 100 and the components within system 100.

Figure 4:
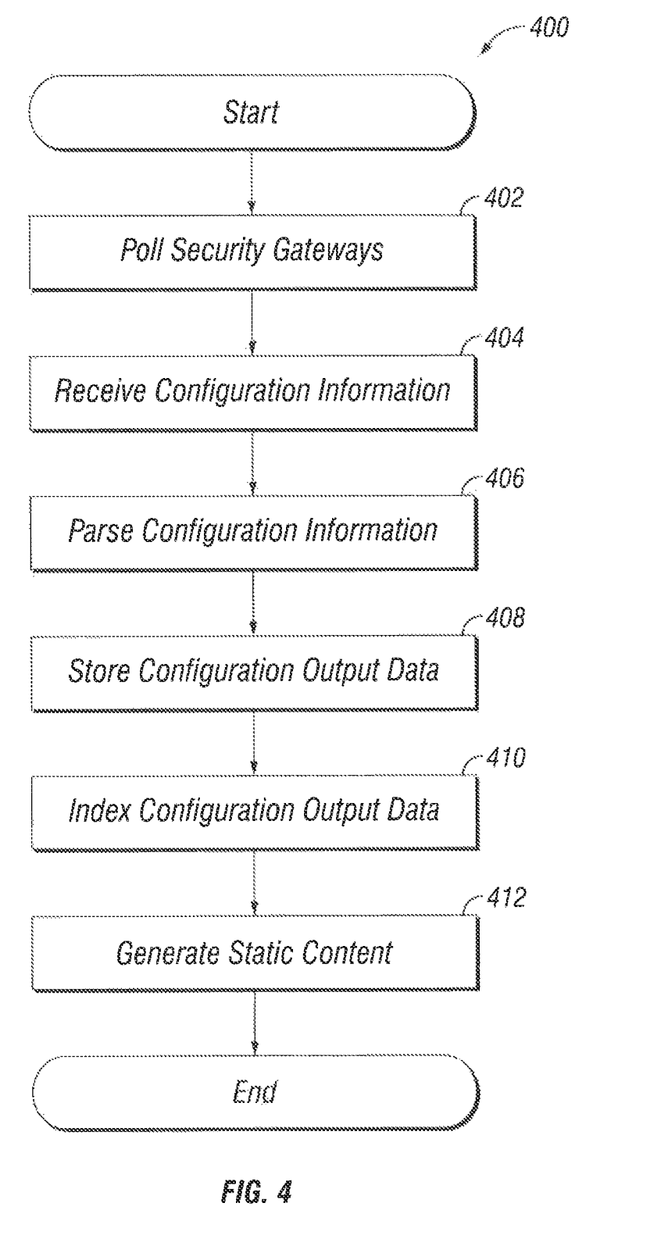
FIG. 4 illustrates a method for the management of security gateways deployed across an enterprise network.

FIG. 4 is a flowchart illustrating a method 400 for managing security gateways deployed across an enterprise network. In particular embodiments, enterprise server 104 may perform method 400. By performing method 400, enterprise server 104 may provide a single reporting mechanism by which enterprise network administrators may manage the configuration of firewalls operating across multiple platforms within the enterprise network.

Enterprise server 104 may begin by polling gateway devices 114 at step 402. In particular embodiments, enterprise server 104 may perform this step on a periodic basis. For example, enterprise server 104 may request updated configuration information from gateway devices 114 on a daily, weekly, monthly, or other predetermined interval. In a particular embodiment, enterprise server 104 may request the updated configuration information at night when enterprise traffic is slower and enterprise resources have increased availability.

In step 404, enterprise server 104 received configuration data from gateway devices 114 that are providing access to enterprise network 102. In particular embodiments, the configuration data is received from multiple gateway devices provided by a variety of vendors. Enterprise server 104 may then parse the configuration information at step 46. Parsing the configuration information may enable enterprise server 104 to identify configuration output data for each of the plurality of gateway devices 114.

In particular embodiments, parsing the configuration data may include normalizing the data to ensure that all configuration data adheres to a uniform structure. For example, enterprise server 104 may read the configuration data in the native format in which it was received and convert the configuration data into a unified format such that it can be centrally stored with configuration data received in other formats. Specifically, enterprise server 104 may convert IP addresses to a binary format in certain embodiments. As another example, enterprise server 104 may verify the validity of IP addresses identified in configuration data. Any data corruptions that are identified may be reported.

Enterprise server 104 may store the configuration output data at step 408. In particular embodiments, the configuration output data may be stored in a data structure 124. The configuration output data may include tables containing separate firewall information such as firewall host objects, ranges, networks, groups, firewall security rules, & firewall NAT rules. For example, the data structure 124 may include a flat file. In other embodiments, a more complex data structure such as a database may be used to store configuration output data 124.

At step 410, enterprise server 104 may then index the configuration output data. For example, enterprise server 104 may create an entry for each occurrence of an object. Thus, is configuration output data includes multiple occurrences of the same object, enterprise server 104 may merge the occurrences into one entry. For example, if the configuration output data includes multiple occurrences of an IP address associated with gateway device 114, enterprise server 104 may create a single line entry for the gateway device 114. The characteristics associated with the multiple occurrences may be stored within a field on the single line.

Static content may then be created for each line entry at step 412. For example, a webpage may be created for each line entry. In one particular embodiment, a webpage may be created for each IP address identified in the configuration output data.

Figure 5:
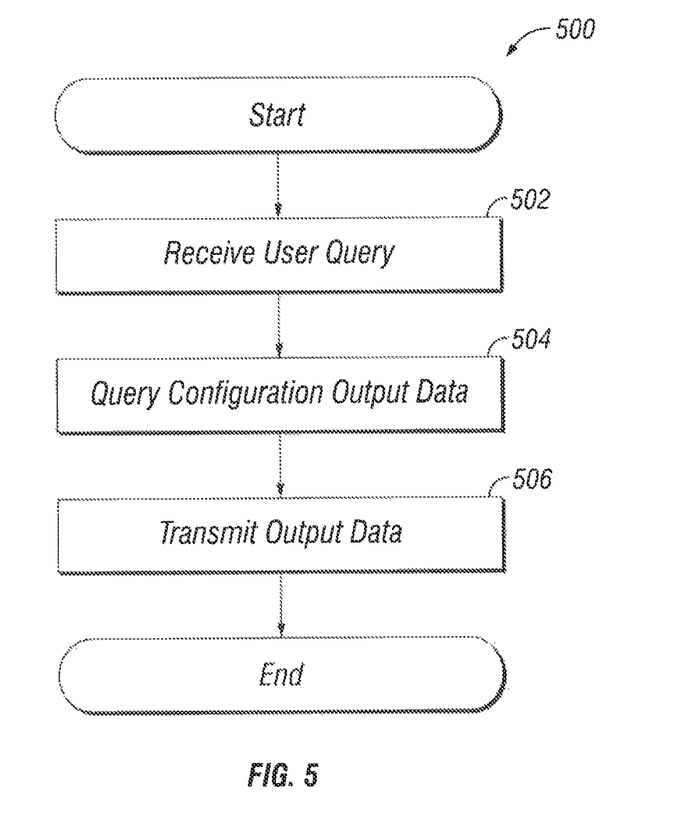
FIG. 5 illustrates a method for providing security gateway configuration data to a user.

As described above, the method performed in steps 402-412 may be performed periodically such that configuration data associated with each gateway device 114 is kept up-to-date and stored in a centralized location that can be accessed by a user. FIG. 5 illustrates a method 500 for providing such gateway configuration data to a user.

Enterprise server may begin the method 500 at step 502 when a user query is received. In particular embodiments, for example, a user of user device 106 may utilize a web browser to input a search query. In particular embodiments, user device 106 may display a GUI such as GUI 200 for receiving the user input query. As described above, a single input field may be provided so that the user can input the search criteria in free text form. The user query may include a standard explicit search, an advance implicit search, a comment search, or any other appropriate search that can be executed against configuration output data 124. In one example embodiment, the user may enter one or more IP addresses. The user may not be required to identify where the IP address exists. Additionally, using an advance search, a user might input a query to look for a range of IP addresses. In this manner, configuration data for gateway devices that fall within the range may be identified without the user being required to explicitly identify the IP address associated with the gateway devices. In still another example, the user may enter any exemptions to not be matched.

At step 504, enterprise server 104 executes the query against the latest data structure containing configuration output data 124. In a particular embodiment, enterprise server 104 may load the index and execute the user query against the index. Because the index contains the associates between the object identifiers, enterprise server 104 is able to identify matching objects and the particular rules or policies that resulted in a match.

The output data identified by enterprise server 104 may be transmitted to the user at step 506. In a particular embodiment, the output data may be transmitted in an HTML format that is intuitive and easy to understand and displayable on a web browser associate with user device 106. For example, the output data may include HTML that includes a report such as the tables depicted in FIGS. 3A and 3B. The data displayed to the user may also be linked to static content such that a user may select data fields within the reports to receive additional information about the object. For example, a user might click on the IP address of a particular enterprise gateway 114. In response, enterprise server 104 may transmit a web page for the particular enterprise gateway to display additional information about the enterprise Certain embodiments of the invention may provide one or more technical advantages. A technical advantage of one embodiment may be that the invention provides a mechanism for analyzing and reporting gateway configurations and rules and policies across an enterprise network. In particular embodiments, configuration data may be gathered from multiple gateway devices regardless of the vendors from which the gateway devices were purchased and/or the platform employed by the gateway devices. As an additional advantage, all firewall policies may be viewed from a single page. In certain embodiments, the report may be exported into a spread sheet format for ease of review and analysis. Additionally or alternatively, the firewall search results may be displayed such that matching objects are identified in a manner that demonstrates to the user what caused the match to be displayed.

Still another advantage may be that certain embodiments allow bulk queries to be submitted. Yet another advantage may be that certain embodiments allow users to execute customized searches that limit results by exempting certain object names. As a result, search results may be narrowed to facilitate reporting. Additionally or alternatively, an indexing scheme may be used to ensure fast reporting.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
   receiving, by at least one computer processor, configuration data comprising security rules from a plurality of gateway devices providing access to an enterprise network, wherein the plurality of gateway devices are associated with a plurality of vendors, and wherein the configuration data is received in a plurality of formats;
   parsing, by the at least one computer processor, the configuration data associated with the plurality of gateway devices to identify configuration data for each of the plurality of gateway devices;
   converting, by the at least one computer processor, the configuration data in a plurality of formats into a unified format;
   storing, by the at least one computer processor, the converted configuration data for each of the plurality of gateway devices into a single data structure;
   indexing, by the at least one computer processor, the converted configuration data stored in the single data structure to associate each of the plurality of gateway devices and corresponding converted configuration data for each of the plurality of gateway devices with an object identifier;
   receiving, by the at least one computer processor, a search query that indicates a first object identifier and an output data format from a client device;
   identifying, by the at least one computer processor, at least one gateway device in the single data structure based on the first object identifier; and
   transmitting, by the at least one computer processor, output data that identifies the at least one gateway device associated with the first object identifier and at least one security rule associated with the identified at least one gateway device in the output data format to the client device.

2. The method of claim 1, wherein the output data further identifies, for each of the at least one gateway devices identified in the output data, at least one configuration rule that satisfied the search query.

3. The method of claim 1, wherein the output data identifies one or more matching characteristics of at least two gateway devices.

4. The method of claim 1, wherein the output data identifies one or more different characteristics of at least two gateway devices.

5. The method of claim 1, wherein the configuration data is received from the plurality of gateway devices on a daily basis.

6. The method of claim 1, further comprising:
converting, by the at least one computer processor, an IP address associated with each gateway device into a binary format prior to indexing the converted configuration data.

7. A system, comprising:
a memory comprising a data structure configured to store data relating to the configuration of a plurality of gateway devices providing access to an enterprise network; and
a processor communicatively coupled to the memory and operable to:
receive configuration data comprising security rules from the plurality of gateway devices providing access to the enterprise network, wherein the plurality of gateway devices are associated with a plurality of vendors, and wherein the configuration data is received in a plurality of formats;
parse the configuration data associated with the plurality of gateway devices to identify configuration data for each of the plurality of gateway devices;
convert the configuration data in a plurality of formats into a unified format;
store the converted configuration data for each of the plurality of gateway devices in the data structure;
index the converted configuration data stored in the single data structure to associate each of the plurality of gateway devices and corresponding converted configuration data for each of the plurality of gateway devices with an object identifier;
receive a search query that indicates a first object identifier and an output data format from a client device;
identify at least one gateway device in the data structure based on the first object identifier; and
transmit output data that identifies the at least one gateway device associated with the first object identifier and at least one security rule associated with the identified at least one gateway device in the output data format to the client device.

8. The system of claim 7, wherein the output data further identifies, for each of the at least one gateway devices identified in the output data, at least one configuration rule that satisfied the search query.

9. The system of claim 7, wherein the output data identifies one or more matching characteristics of at least two gateway devices.

10. The system of claim 7, wherein the output data identifies one or more different characteristics of at least two gateway devices.

11. The system of claim 7, wherein the configuration data is received from the plurality of gateway devices on a daily basis.

12. The system of claim 7, wherein the processor is further operable to:
convert an IP address associated with each gateway device into a binary format prior to indexing the converted configuration data.

13. Logic embedded in a non-transitory computer readable storage medium and operable, when executed by a processor, to:
receive configuration data comprising security rules from a plurality of gateway devices providing access to an enterprise network, wherein the plurality of gateway devices are associated with a plurality of vendors, and wherein the configuration data is received in a plurality of formats;
parse the configuration data associated with the plurality of gateway devices to identify configuration data for each of the plurality of gateway devices;
convert the configuration data in a plurality of formats into a unified format;
store, in a single data structure, the converted configuration output data for each of the plurality of gateway devices;
index the converted configuration data stored in the single data structure to associate each of the plurality of gateway devices and corresponding converted configuration data for each of the plurality of gateway devices with an object identifier;
receive a search query that indicates a first object identifier and an output data format from a client device;
identify at least one gateway device in the single data structure based on the first object identifier; and
transmit output data that identifies the at least one gateway device associated with the first object identifier and at least one security rule associated with the identified at least one gateway device in the output data format to the client device.

14. The logic of claim 13, wherein the output data further identifies, for each of the at least one gateway devices identified in the output data, at least one configuration rule that satisfied the search query.

15. The logic of claim 13, wherein the output data identifies one or more matching characteristics of at least two gateway devices.

16. The logic of claim 13, wherein the output data identifies one or more different characteristics of at least two gateway devices.

17. The logic of claim 13, further operable when executed to:
convert an IP address associated with each gateway device into a binary format prior to indexing the converted configuration data.

* * * * *